US011861253B2

(12) United States Patent
Fujisaki

(10) Patent No.: US 11,861,253 B2
(45) Date of Patent: Jan. 2, 2024

(54) IMAGE PROCESSING APPARATUS AND IMAGE PROCESSING METHOD FOR MANAGING SETTINGS TO ALLOW OR PROHIBIT A CHARACTER RECOGNITION FUNCTION

(71) Applicant: SHARP KABUSHIKI KAISHA, Sakai (JP)

(72) Inventor: Tatsuya Fujisaki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/114,223

(22) Filed: Feb. 25, 2023

(65) Prior Publication Data

US 2023/0280954 A1 Sep. 7, 2023

(30) Foreign Application Priority Data

Mar. 4, 2022 (JP) ................................. 2022-033585

(51) Int. Cl.
*G06F 3/12* (2006.01)
*G06V 30/10* (2022.01)

(52) U.S. Cl.
CPC .......... *G06F 3/1255* (2013.01); *G06F 3/1205* (2013.01); *G06F 3/1238* (2013.01); *G06F 3/1279* (2013.01); *G06V 30/10* (2022.01)

(58) Field of Classification Search
CPC .... G06F 3/1255; G06F 3/1205; G06F 3/1238; G06F 3/1279; G06V 30/10

USPC ........................................................ 358/1.14
See application file for complete search history.

(56) References Cited

U.S. PATENT DOCUMENTS

| 8,452,601 B2* | 5/2013 | Anderson | G06F 40/186 704/271 |
| 2010/0149569 A1* | 6/2010 | Yoshida | G06V 30/262 358/1.11 |
| 2021/0377395 A1* | 12/2021 | Hamada | H04N 1/3878 |

FOREIGN PATENT DOCUMENTS

JP 2014-238787 A 12/2014

\* cited by examiner

*Primary Examiner* — Allen H Nguyen
(74) *Attorney, Agent, or Firm* — ScienBiziP, P.C.

(57) ABSTRACT

According to an embodiment, an image processing apparatus includes: a character recognition processor which reads an image of a document and extracts text information in the document; a setting manager which manages settings including a setting to allow or prohibit a function of character recognition; a job controller which controls job execution related to reading of the document; and an operation controller which provides a setting menu to receive a setting of at least one item related to the job execution and receives a setting, in which when the function of the character recognition is set to be prohibited, the operation controller hides a function that requires the character recognition from the setting menu or indicates that the function is not to be set, and when the function that requires the character recognition has already been set, the operation controller enables the function to be replaced by another function.

8 Claims, 12 Drawing Sheets

FIG. 10A

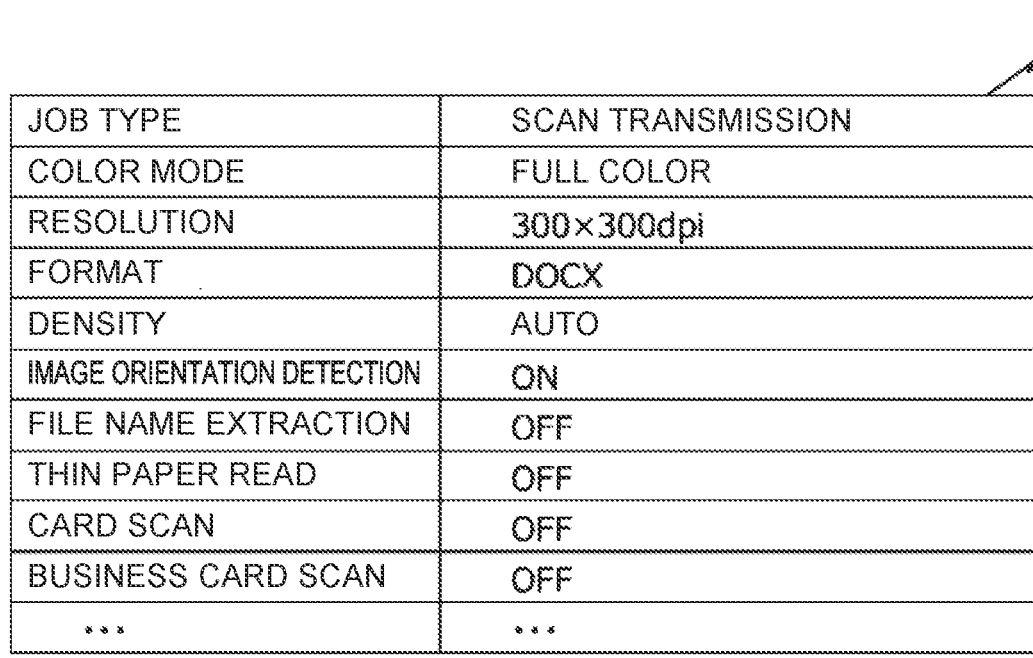

| JOB TYPE | SCAN TRANSMISSION |
|---|---|
| COLOR MODE | FULL COLOR |
| RESOLUTION | 300×300dpi |
| FORMAT | DOCX |
| DENSITY | AUTO |
| IMAGE ORIENTATION DETECTION | ON |
| FILE NAME EXTRACTION | OFF |
| THIN PAPER READ | OFF |
| CARD SCAN | OFF |
| BUSINESS CARD SCAN | OFF |
| ... | ... |

FIG. 10B

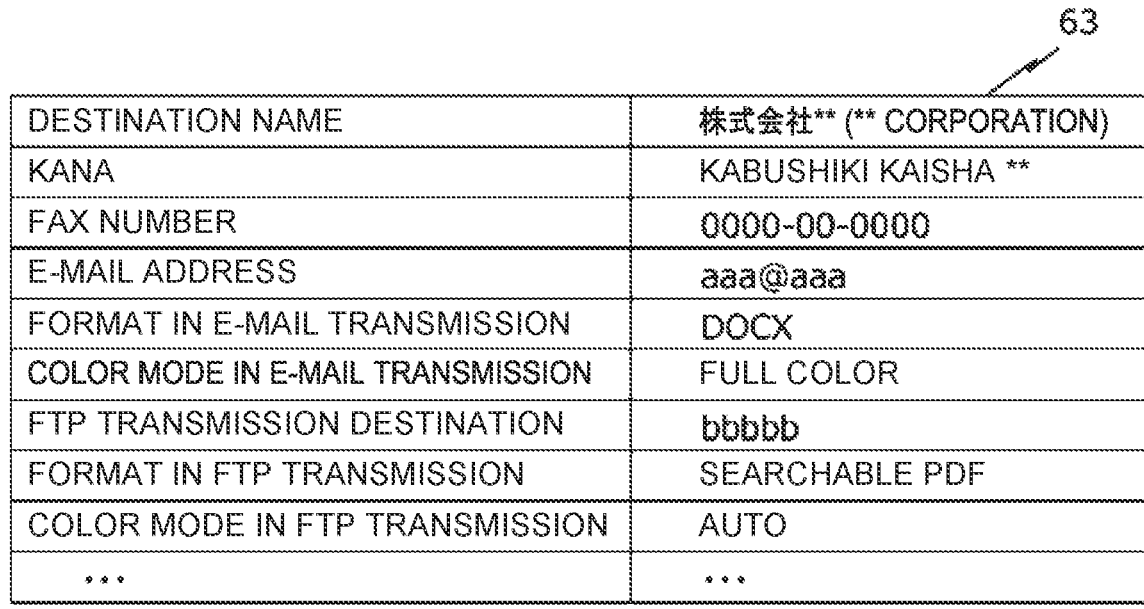

| DESTINATION NAME | 株式会社 ( CORPORATION) |
|---|---|
| KANA | KABUSHIKI KAISHA ** |
| FAX NUMBER | 0000-00-0000 |
| E-MAIL ADDRESS | aaa@aaa |
| FORMAT IN E-MAIL TRANSMISSION | DOCX |
| COLOR MODE IN E-MAIL TRANSMISSION | FULL COLOR |
| FTP TRANSMISSION DESTINATION | bbbbb |
| FORMAT IN FTP TRANSMISSION | SEARCHABLE PDF |
| COLOR MODE IN FTP TRANSMISSION | AUTO |
| ... | ... |

IMAGE PROCESSING APPARATUS AND IMAGE PROCESSING METHOD FOR MANAGING SETTINGS TO ALLOW OR PROHIBIT A CHARACTER RECOGNITION FUNCTION

BACKGROUND OF THE INVENTION

Field of the Invention

The present disclosure relates to an image processing apparatus and an image processing method, and more particularly relates to an image processing apparatus and an image processing method having a character recognition function of reading an image of a document and extracting text information included in the document.

Description of the Background Art

Image processing apparatuses such as multifunction peripherals have, in most cases, the function of reading a document, and generating data files in formats such as Portable Document Format (PDF) (registered trademark) and Joint Photographic Experts Group (JPEG) on the basis of an image of the read document. The generated file is then sent as an attachment to an e-mail, or sent to other devices by a data transfer method such as a File Transfer Protocol (FTP). Alternatively, the generated file can be stored in a storage device provided in the image processing apparatus, and downloaded to an external device, such as a smartphone or a personal computer (PC).

In recent years, apparatuses which are equipped with a character recognition (also referred to as Optical Character Recognition (OCR) or Optical Character reading) function, and perform processing related to character recognition (also referred to as character recognition processing or OCR processing) on the read document image, thereby extracting character information of the document have increased. Image processing apparatuses, which perform OCR processing on input image data, and convert an image into a data file of a format (hereinafter simply referred to as a file format, such as a file format for document, presentation, or spreadsheet) corresponding to a result of the OCR processing and output the data file, are known.

In order to provide an OCR function, some of the apparatuses are equipped with a module that executes OCR processing within the image processing apparatus, or provide the OCR function in cooperation with an external device or a server. By use of the OCR function, files in data formats such as "searchable PDF" (a PDF in a data format with text information embedded therein and in which a text search is possible), "PDF/A-1a" (a data format of a tagged PDF defined by the ISO standards), and "Office file formats (DOCX, XLSX, PPTX)" can be generated.

Furthermore, on the basis of the results of the OCR, the following functions are realized. First, a top-bottom determination function of determining the orientation of the top and bottom of documents and making the orientations of the respective documents uniform is one example of the functions. Another example of the functions is a file name automatic setting function of extracting a character string which can be a title from a document and setting the file name. Yet another example of the functions is a business card scan function of reading a document, which is a business card, and determining the name, company name, department name, telephone number, facsimile number, and the like, on the business card. All of the above functions are realized on the premise of application of the OCR processing.

As described above, since the image processing apparatus is equipped with the OCR function, it has become possible to increase the variety of file formats to be generated, and provide the user with useful functions such as the top-bottom determination function, the file name automatic setting function, and the business card scan function.

Meanwhile, since characters included in a document can be acquired as "text information", there is a possibility that the text information may be used for the wrong purpose. For example, in a use such as scanning a highly confidential document, i.e., a contract or the like, there may be a need to prohibit the OCR function in order to minimize the risk of information leakage.

Further, since there exist functions that are premised on the OCR function, if an OCR function prohibition/allowance setting is provided, those functions are also affected. For example, a function of registering a setting related to a job, and executing the job by calling that setting at a later date is assumed. If settings related to a job are registered with the OCR function being allowed, settings of a job that uses the OCR function are registered. After that, it is supposed that the OCR function is prohibited to prevent information leakage. If the setting of a registered job is called after the OCR function has been prohibited, and the job is executed on the basis of that setting, the OCR function set to be prohibited at that point of time will be implemented, and the object of preventing information leakage cannot be achieved.

Furthermore, it is possible to read a document with the OCR function being allowed, and store, in a storage device within an image processing apparatus, image data with text information embedded therein. After that, it is supposed that the OCR function is prohibited to prevent information leakage. If the image data stored in the storage device is called after the OCR function has been prohibited, and a job of transmitting the image data to an external device is executed, data with the text information embedded therein will be transmitted outside, and the object of preventing information leakage cannot be achieved.

As described above, when a character recognition function prohibition/allowance setting is to be provided, consideration must be given to the other functions related to the character recognition function.

The present disclosure has been made in consideration of the above circumstances, and provides a method which would not confuse the user by avoiding, in providing a setting to prohibit/allow a character recognition function of an image processing apparatus, occurrence of inconsistency in the function and operation related to the provided setting.

SUMMARY OF THE INVENTION

The present disclosure provides an image processing apparatus including: a character recognition processor which reads an image of a document and extracts text information included in the document; a setting manager which manages settings including a setting to allow or prohibit a function of character recognition by the character recognition processor; a job controller which controls execution of a job related to reading of the document; and an operation controller which provides, to a user, a setting menu to receive a setting of one or more items related to the execution of the job and receives a setting from the user, in which the operation controller prevents, when the function of the character recognition is set to be prohibited, the user from setting a function that requires the character recognition.

Further, from another perspective, the present disclosure provides an image processing method in which a processor of an image processing apparatus executes the image processing method including: a step of using a character recognition processor to read an image of a document and extract text information included in the document; a step of managing settings including a setting to allow or prohibit a character recognizing step by the character recognition processor; a step of controlling execution of a job related to reading of the document based on the setting; and a step of providing, to a user, a setting menu to receive a setting of one or more items related to the execution of the job, and receiving a setting from the user, in which when a function of the character recognizing is set to be prohibited, a function that requires the character recognizing is prevented from being set by the user.

The image processing apparatus according to the present disclosure includes: the setting manager which manages the settings including the setting to allow or prohibit the function of character recognition by the character recognition processor; and the operation controller, and the operation controller prevents, when the function of character recognition is set to be prohibited, the user from setting a function that requires the character recognition. Therefore, in providing a setting to prohibit/allow a character recognition function, occurrence of inconsistency in the function and operation related to the provided setting can be avoided.

The image processing method according to the present disclosure also exhibits similar effects and advantages.

BRIEF DESCRIPTION OF THE DRAWINGS

FIG. 10A is an explanatory diagram illustrating an example of registration data of a job program in the present embodiment.

FIG. 10B is an explanatory diagram illustrating an example of registration data of an address book in the present embodiment.

DESCRIPTION OF THE PREFERRED EMBODIMENTS

The present disclosure will now be described in more detail with reference to the accompanying drawings. The following description is illustrative in all respects and should not be construed as limiting the present disclosure.

Embodiment 1

Configuration Example of Image Processing Apparatus

Figure 1:
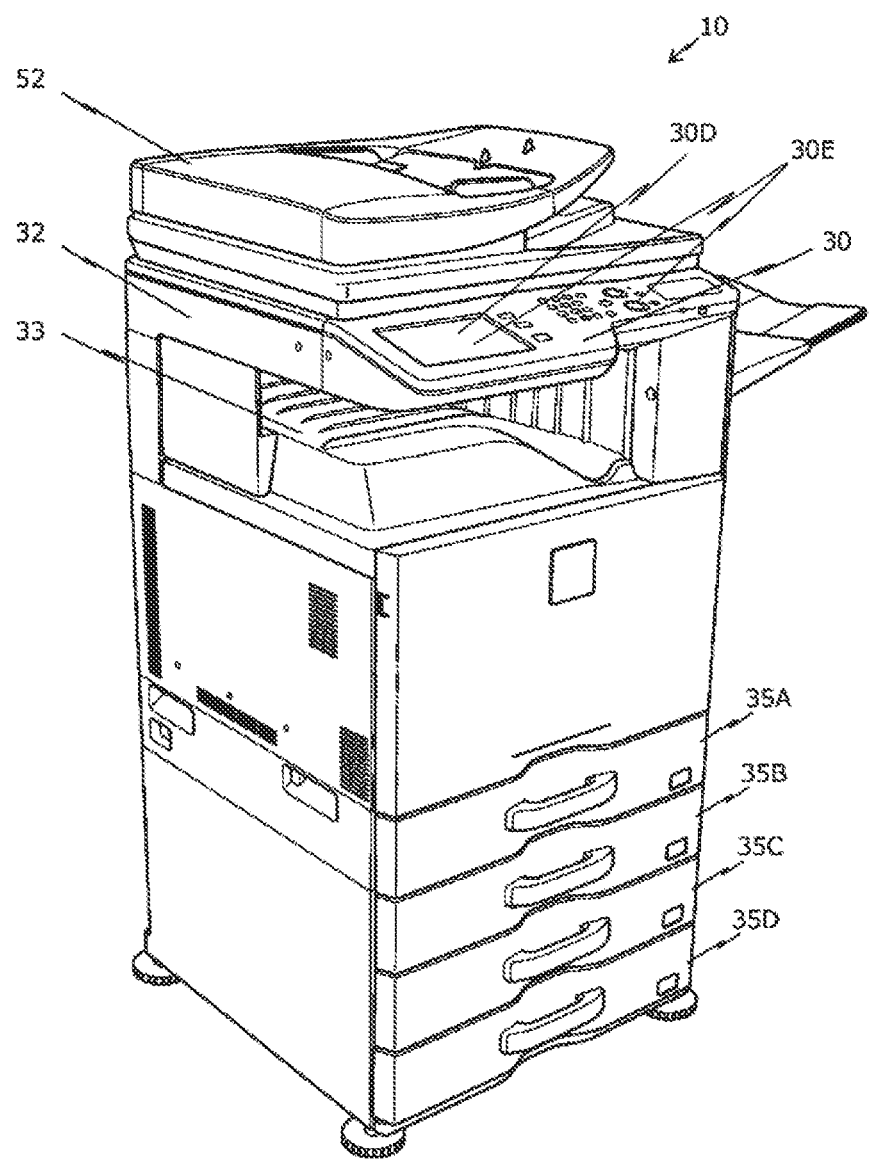
FIG. 1 is a perspective view illustrating the outer appearance of a multifunction peripheral, as an example of an image processing apparatus according to the present disclosure.

FIG. 1 is a perspective view illustrating the outer appearance of a multifunction peripheral 10 as an example of an image processing apparatus according to the present disclosure.

As illustrated in FIG. 1, the multifunction peripheral 10 is provided with an operator 30 which receives an operation by a user, a scanner portion 32 including a document feeder 31, and an engine portion 34 which performs printing. The engine portion 34 is provided with four paper feed trays 35A to 35D for accommodating printing sheets at a lower part of the engine portion 34, and also a paper discharge tray 33 on an upper part of the engine portion 34 at a position below the scanner portion 32.

Figure 2:
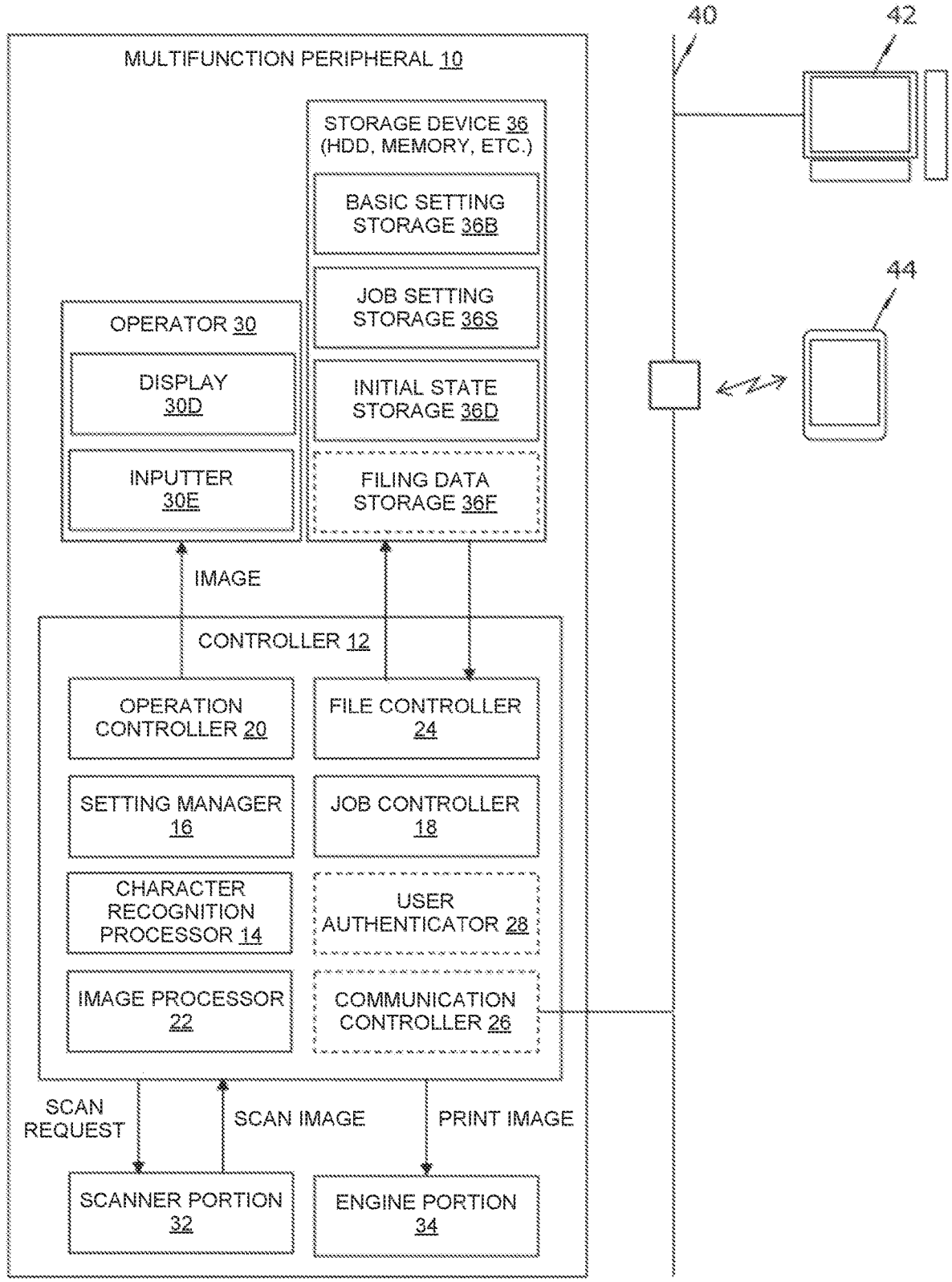
FIG. 2 is a block diagram illustrating the configuration of the multifunction peripheral illustrated in FIG. 1.

FIG. 2 is a block diagram illustrating the configuration of the multifunction peripheral 10 illustrated in FIG. 1. As illustrated in FIG. 2, in addition to the operator 30, the scanner portion 32, and the engine portion 34 illustrated in FIG. 1, the multifunction peripheral 10 is provided with a controller 12 and a storage device 36.

The operator 30 is provided with a display 30D which includes a liquid crystal display device and an LED lamp to provide information to the user. In addition, the operator 30 is provided with an inputter 30E which includes hardware operation keys (also referred to as hard keys) and a touch panel to receive an operation by the user.

The scanner portion 32 is provided with the document feeder 31 which conveys a document, a scanning mechanism which scans the document, and an image sensor which reads an image of the document.

The engine portion 34 includes: the paper feed trays 35A to 35D for accommodating printing sheets; a sheet conveyance mechanism which feeds the printing sheet from the paper feed trays 35A to 35D and guides the printing sheet to the paper discharge tray 33; an image former which forms a toner image by an electrophotographic method; and a transfer mechanism which transfers the formed toner image to the printing sheet that has been conveyed.

The storage device 36 includes a hard disk drive (HDD), a solid state drive (SSD), a dynamic random access memory (DRAM), or a combination thereof. The storage device 36 includes a basic setting storage 36B which stores basic settings of the multifunction peripheral 10 and a job setting storage 36S which stores data pertaining to job settings. The basic settings are settings that are not related to individual jobs but are applied to processing of the multifunction peripheral 10 continuously. The setting to allow or prohibit an OCR function belongs to the basic settings. The data pertaining to job settings corresponds to data pertaining to settings related to individual jobs, in other words, settings of each item of a setting menu. As will be described later, a file format employed in transmitting, to an external device, data of a document which has been read by a scan transmission job is an example of the data pertaining to job settings.

In addition, the storage device 36 includes an initial state storage 36D which stores the initial state of a setting menu. Further, the storage device 36 arbitrarily includes a filing data storage 36F which stores data of the read document image.

The controller 12 employs an electronic circuit including a processor and a memory as the main elements for hardware resources. As the processor executes a control program stored in the memory, the functions of the controller 12 are implemented. The controller 12 functionally includes a character recognition processor 14, a setting manager 16, a job controller 18, an operation controller 20, an image processor 22, and a file controller 24. Further, the controller 12 arbitrarily includes a communication controller 26 and a user authenticator 28.

The character recognition processor 14 performs character recognition processing of extracting text information from an image of a document by using a well-known technique. In the present embodiment, it is assumed that the character recognition processor 14 alone performs the character recognition processing. However, the function of the character recognition processing may be provided through communication with a device such as an external server which provides the service of character recognition processing.

The setting manager 16 manages data (basic setting data) pertaining to the basic settings to be set by a user operation received via the operator 30. The basic setting data may be set by using the setting menu. The basic setting data includes data pertaining to the setting of allowing or prohibiting the OCR function.

The job controller 18 controls execution of a series of processes (jobs) related to image processing such as causing the scanner portion 32 to read a document or causing the engine portion 34 to form a toner image and transfer (print) the toner image on a printing sheet, on the basis of the setting and an instruction received via the operator 30. Also, the job controller 18 registers or deletes those jobs in a queue (a run queue), starts execution of the job registered in the queue, or stops the job being executed.

The operation controller 20 causes the display 30D to perform a display related to the state of the multifunction peripheral 10 or the job settings, and recognizes the user operation received by the inputter 30E provided in the operator 30. If the operation is that related to setting of the basic setting data, the operation controller 20 updates the basic setting data, which is managed by the setting manager 16 and is stored in the basic setting storage 36B, accordingly. Further, if the operation is that related to setting of a job, the operation controller 20 updates the data (job setting data) pertaining to job settings stored in the job setting storage 36S accordingly. The operation controller 20 provides a setting menu to the user via the display 30D. Then, the operation controller 20 receives the settings from the user. That is, the operation controller 20 carries out processing related to a user interface. Note that the operation controller 20 may display, not only by way of the display 30D and the inputter 30E, a setting menu on a screen of an external device 42 (a PC, for example) or an external device 44 (a smartphone, for example) which is connected via a network, and receive a remote operation using the setting menu.

The image processor 22 performs processing on an image according to the substance of image processing requested from the job controller 18. Examples of the processing on an image include magnification varying processing, cropping of an image, determination of whether paper is blank or not, and determination of a document area.

The file controller 24 saves a data file to or reads the same from the storage device 36.

The communication controller 26 controls communication with an external device connected via a communication circuit of the multifunction peripheral 10 not illustrated in FIGS. 1 and 2. The communication may either be wireless or wired. FIG. 2 illustrates the state in which the external devices 42 and 44 are connected via a network 40. The type of the external device is not limited as long as the device can communicate with the multifunction peripheral 10. An example of the external device is a PC. Alternatively, the external device is a portable information device such as a smartphone or a tablet terminal connected wirelessly.

In the above, the configuration of the multifunction peripheral 10 has been described as an example of the image processing apparatus in the present embodiment.

Figure 3:
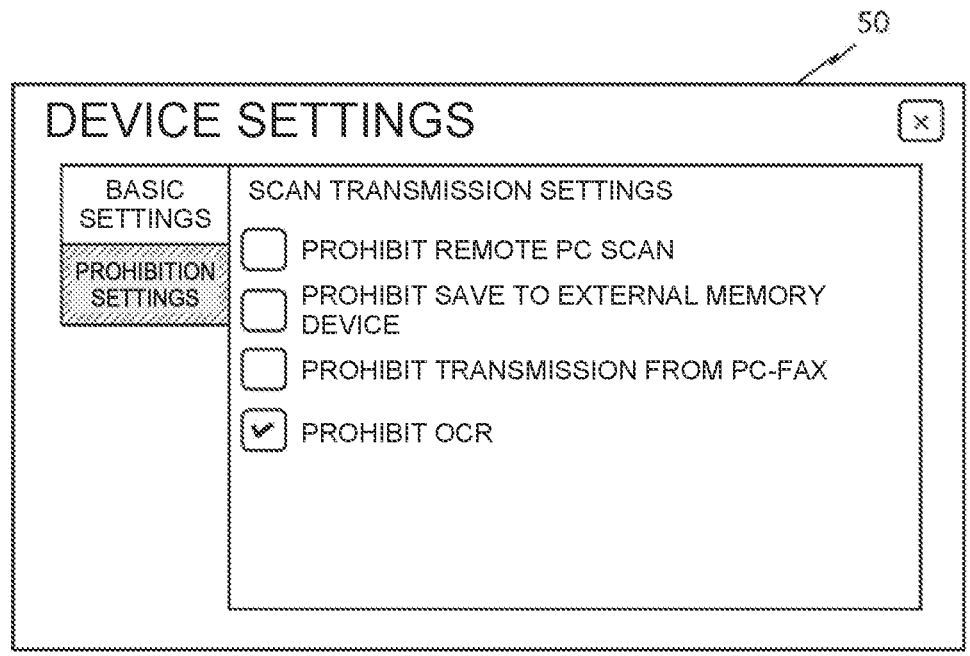
FIG. 3 is an explanatory diagram illustrating a device setting screen, which is one of setting menus, in the present embodiment.

Example of Setting Menu to Allow or Prohibit Character Recognition Function Next, an example of control related to a setting menu executed by the controller 12 of the present embodiment will be described. First, an example of an operation of the setting to allow or prohibit the function of character recognition will be described. FIG. 3 is an explanatory diagram illustrating an example of a device setting screen 50, which is one of setting menus displayed on the display 30D by the operation controller 20, in the present embodiment. The device setting screen 50 is a screen which receives the setting to allow or prohibit the function of OCR processing of the multifunction peripheral 10. In the example illustrated in FIG. 3, an item that allows/prohibits the function of the OCR processing is provided together with other items (allowance/prohibition of a remote PC scan, allowance/prohibition of a save to an external memory device, and allowance/prohibition of transmission from a PC-Fax). Since the other items are merely displayed on the same screen as the OCR function and are not substantially related to the OCR function, a description of the other items is omitted.

In the setting menu illustrated in FIG. 3, the operation controller 20 causes a check box to be displayed on the left side of each item. When the user touches a position of the check box with his/her finger, the inputter 30E detects the touch and the position of the touch. In response to that detection, the operation controller 20 alternately turns off and on a check mark by which the state of being allowed or prohibited is represented each time the check box is touched. As illustrated in FIG. 3, the state in which a check mark is displayed for the item which is "Prohibit OCR" corresponds to the state in which the function of the OCR processing is prohibited. While the screen illustrated in FIG. 3 is an example of the display 30D, a similar screen and function may be provided as the screen of the external devices 42 and 44 via the network. That is, the function of the OCR processing may be set to be allowed or prohibited by a remote operation using the external devices 42 and 44.

Example of Reflecting Character Recognition Function Allowance/Prohibition Setting Status in Job Setting Next, an example of reflecting the setting of allowing/prohibiting the character recognition function in the setting menu related to the settings of the job in items will be described. Here, as an example of the job, a scan transmission job of sending, in a file format set by the user, an image of a document that has been read to an external device set by the user, i.e., the external device 42 or 44, for example, will be described. When the scan transmission job can be executed, it is assumed that the multifunction peripheral 10 is provided with the communication controller 26 for communicating with the external device 42 or 44.

Figure 4A:
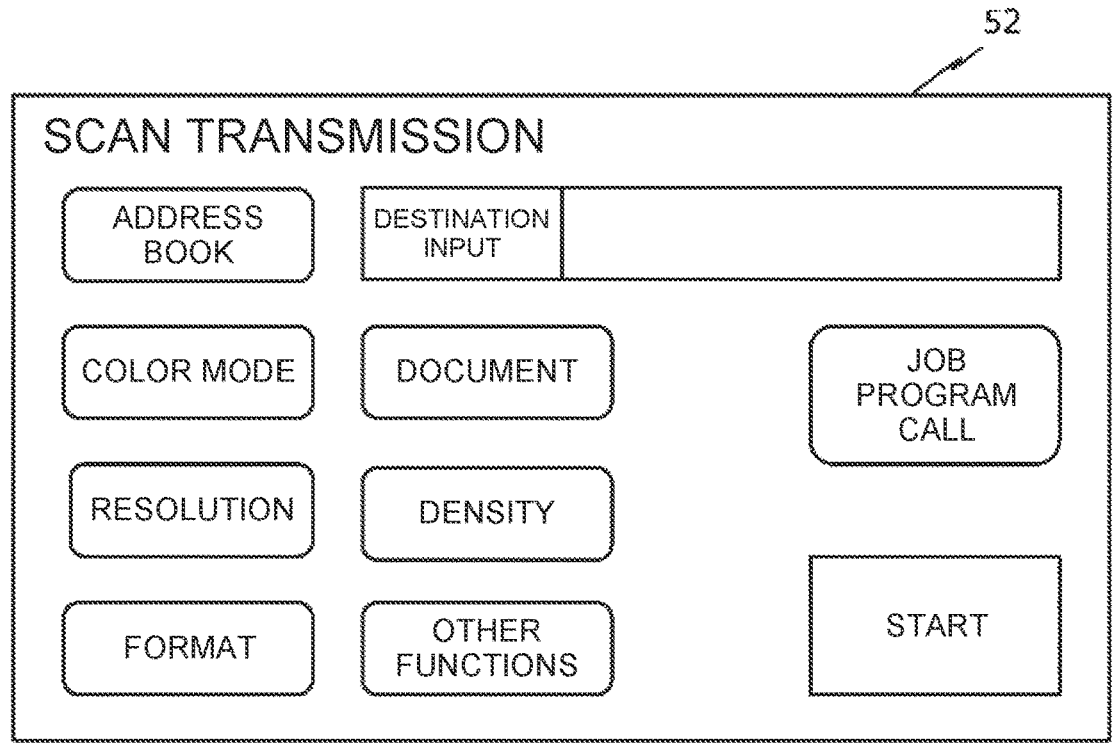
FIG. 4A is an explanatory diagram illustrating a scan transmission screen, which is one of the setting menus, in the present embodiment.
Figure 4B:
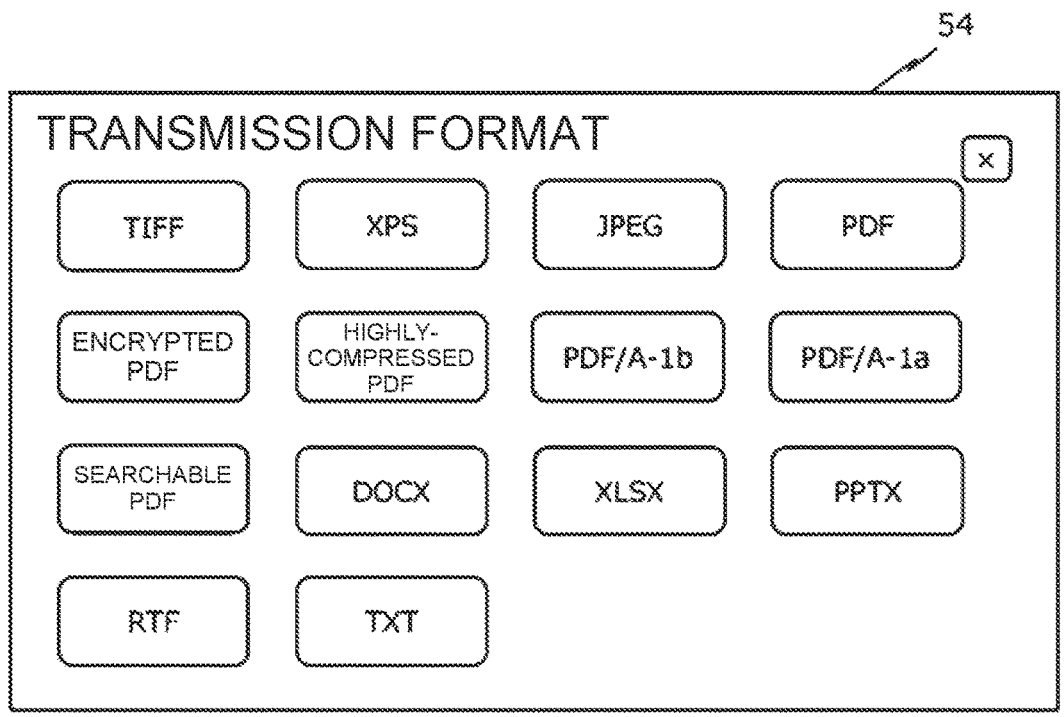
FIG. 4B is an explanatory diagram illustrating an example of a transmission format screen, which is one of the setting menus, to be presented when a character recognition function is allowed in the present embodiment.

FIGS. 4A and 4B show an example of a screen for selecting a transmission format of a scan transmission job in the multifunction peripheral 10 capable of performing the OCR processing, more specifically, a file format to be employed in the transmission to the external device.

FIG. 4A is an example of a scan transmission screen 52, which is one of the setting menus displayed on the display 30D by the operation controller 20. On the scan transmission screen 52, operation keys (also referred to as soft keys) on the screen are arranged correspondingly to items such as "color mode", "document", "resolution", "density", "format", and "other functions" related to document reading. The operation controller 20 displays each of the soft keys along with the name corresponding to the item. When the user touches the soft key of each item with his/her finger, the operation controller 20 receives the operation via the touch panel. The key [Color Mode] receives the setting of color, grayscale, or black-and-white (bitonal). The key [Document] receives specification of the document size and whether the document is single-sided or double-sided. [Other Functions] is a soft key that displays a setting menu, which is not illustrated in FIG. 4A, to receive setting of other functions not accommodated in FIG. 4A. The other functions include, for example, an image orientation detection function, a file name extraction function, a thin paper read function, a card scan function, and a business card scan function. Since the keys other than [Format] have low relevance to the setting of allowing/prohibiting the OCR function, further explanation of these functions is omitted here.

Further, calling of a job program already registered and an address book can also be operated from the same screen. The job program and the address book will be described later.

When the key [Format] is operated on the scan transmission screen 52, the operation controller 20 displays, on the display 30D, a transmission format screen 54 illustrated in FIG. 4B in response to the operation. In the example illustrated in FIG. 4B, as file formats which can be employed for transmission in the scan transmission job, a total of 14 types of file formats including ones that require the OCR function and ones that do not can be specified. The operation controller 20 display soft keys corresponding to respective file formats on the transmission format screen 54. Among those file formats, there are seven types of file formats, i.e., TIFF, XPS, JPEG, PDF, encrypted PDF, highly-compressed PDF, and PDF/A-1b, as the file formats that do not require the OCR function. Meanwhile, there are seven types of file formats, i.e., PDF/A-1a, searchable PDF, DOCX, XLSX, PPTX, RTF, and TXT, as the file formats that require the OCR function.

When a scan transmission job is to be executed, one of these file formats must be set by the user. When the OCR function is set to be allowed, the operation controller 20 displays, on the display 30D, the transmission format screen 54 for setting any one of the file formats among the 14 types of file formats illustrated in FIG. 4B.

Figure 5:
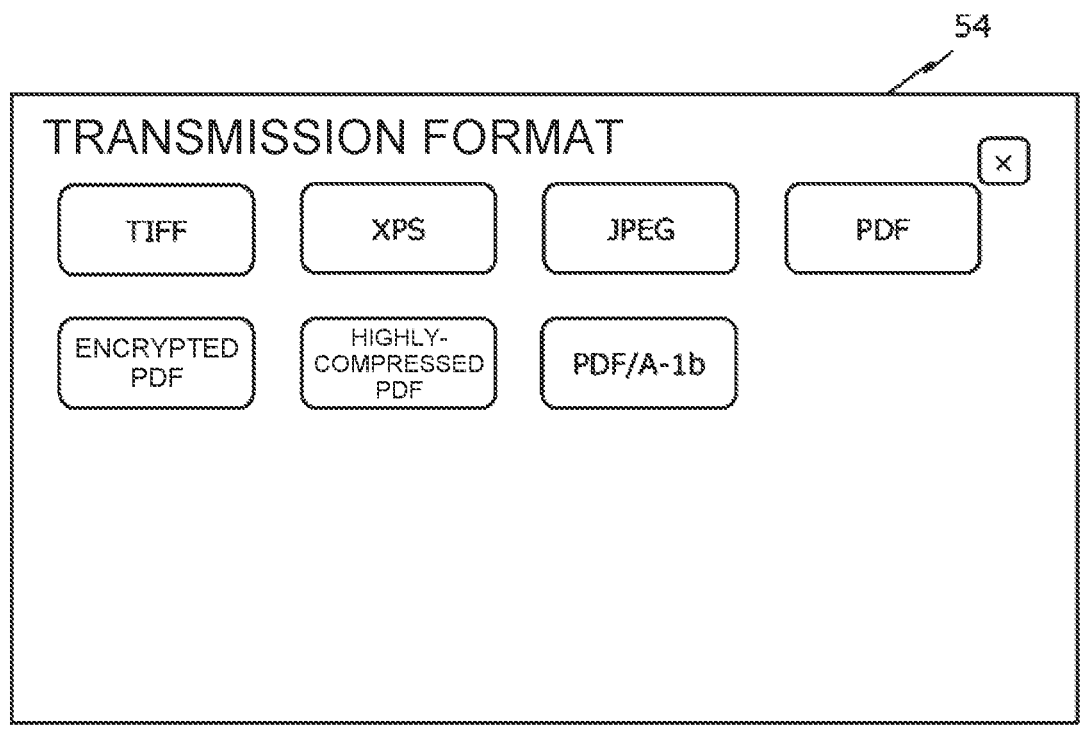
FIG. 5 is an explanatory diagram illustrating an example of the transmission format screen to be presented when the character recognition function is prohibited in the present embodiment.

In contrast, FIG. 5 is an explanatory diagram illustrating an example of the transmission format screen 54 displayed on the display 30D by the operation controller 20 when the OCR function is set to be prohibited. A difference from the transmission format screen 54 illustrated in FIG. 4B is that the soft keys corresponding to the above-mentioned seven types of file formats that require the OCR function are not displayed, in other words, are hidden. The transmission format screen 54 of FIG. 5 displays only the operation keys on the screen corresponding to the seven types of file formats that do not require the OCR function. In the example illustrated in FIG. 5, setting items corresponding to the file formats that require the OCR function are hidden. However, these setting items may be grayed out, for example, to indicate that they are not to be set (i.e., cannot be selected).

Figure 6:
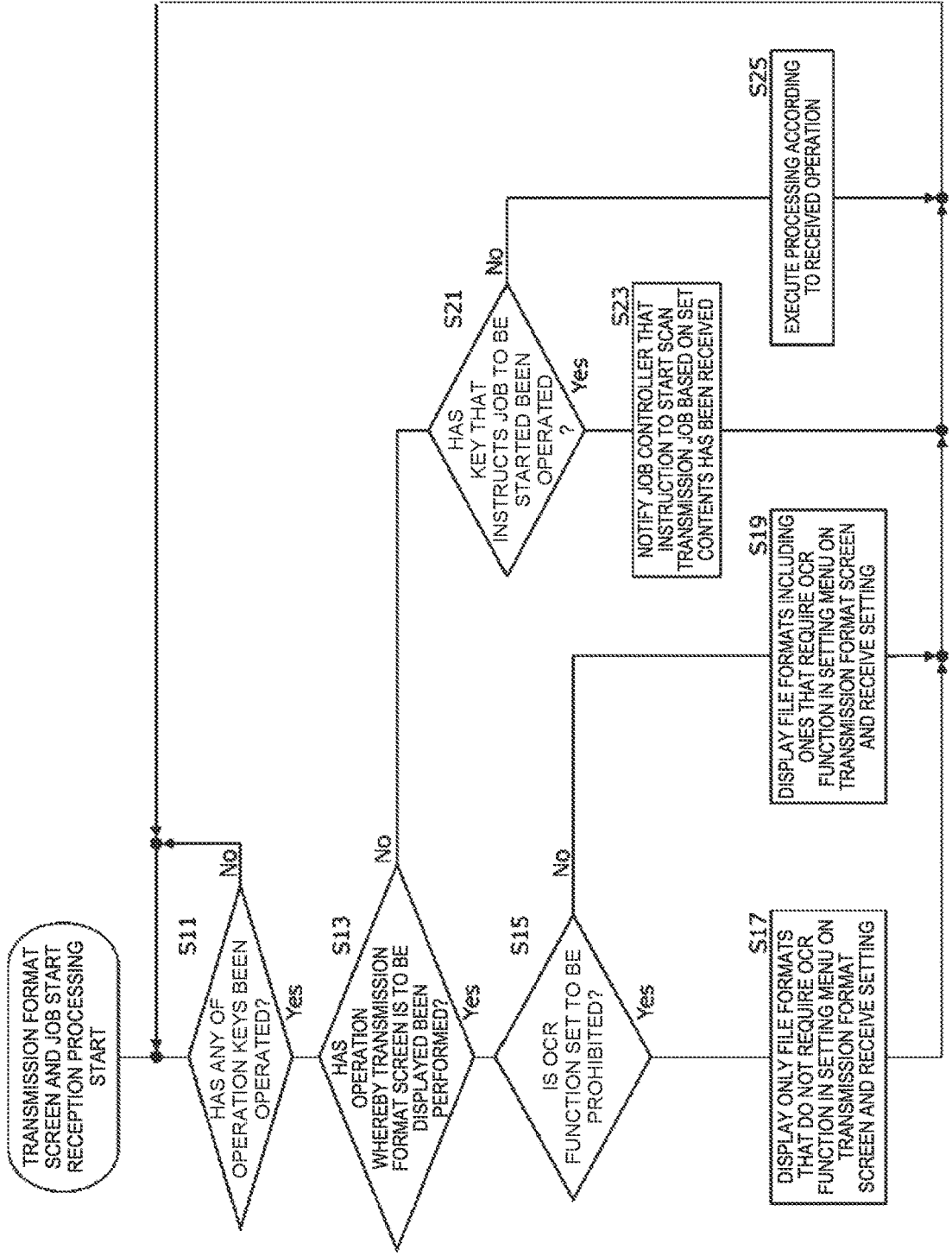
FIG. 6 is a flowchart illustrating processing executed by a controller in the examples shown in FIGS. 4A, 4B, and 5.

FIG. 6 is a flowchart illustrating the processing executed by the controller 12 serving mainly as the operation controller 20 in the examples shown in FIGS. 4A, 4B, and 5. As illustrated in FIG. 6, the controller 12 serving as the operation controller 20 monitors whether the touch panel or any of the hard keys arranged on the display 30D has been operated (i.e., the loop when No applies in step S11). Further, if the touch panel or the hard key has been operated (Yes in step S11), it is determined whether or not the operation corresponds to an operation whereby the transmission format screen 54 illustrated in FIG. 4B or 5 is to be displayed (step S13). Specifically, it is determined whether or not the key [Format] has been pressed on the scan transmission screen illustrated in FIG. 4A.

If an operation whereby the transmission format screen 54 is to be displayed is performed (Yes in step S13), the operation controller 20 determines whether or not the OCR function is set to be prohibited (step S15).

If the OCR function is set to be prohibited, the operation controller 20 displays, as illustrated in FIG. 5, only the file formats that do not require the OCR function on the transmission format screen 54, and receives setting, in other words, selection of the file format (step S17). Accordingly, file formats that require the OCR function cannot be set. Further, the data stored in the job setting storage 36S is updated in accordance with the selection of the file format that has been received. Meanwhile, if the OCR function is set to be allowed (No in step S15), the operation controller 20 displays, as illustrated in FIG. 4B, both of the setting items that require the OCR function and the setting items that do not require the OCR function on the transmission format screen 54, and receives setting of the file format (step S19). Further, the data stored in the job setting storage 36S is updated in accordance with selection of the file format that has been received. After receiving the setting of the file format for the data to be transmitted on the transmission format screen 54 in this way, the operation controller 20 returns the processing to step S11 described above, and waits for any of the operation keys to be operated next.

In step S13 described above, if the substance of the operation is not one that requests display of the transmission format screen 54 (No in step S13), the operation controller 20 subsequently determines whether or not an instruction to start a scan transmission job has been received (step S21). If an instruction to start a scan transmission job has been received (Yes in step S21), the operation controller 20 notifies the job controller 18 that the instruction to start the scan transmission job with the current settings has been received (step S23). In response to that notification, the job controller 18 starts the scan transmission job. Then, according to the settings stored in the job setting storage 36S, the scan transmission job of reading and sending a document is executed.

Meanwhile, the operation controller 20 returns the processing to step S11 described above, and waits for any of the operation keys to be operated next.

In the determination of step S21 described above, if the substance of the operation is not an instruction to start a scan transmission job (No in step S21), the operation controller 20 performs the processing according to the received operation (step S25). Further, if setting related to a job is received, the data stored in the job setting storage 36S is updated in accordance with the received setting related to the job. Moreover, the processing is returned to step S11 described above to wait for any of the operation keys to be operated next.

In the above, the transmission format screen 54 has been described but the present disclosure is not limited thereto. That is, also for the other items of a setting menu affected by the setting status of allowance/prohibition of the OCR function, the operation controller 20 applies a similar technique to the display of the setting menu.

Example of Reflecting Character Recognition Function Allowance/Prohibition Setting Status in Initial State of Setting Menu Next, an example in which the operation controller 20 reflects the allowance/prohibition setting status of the character recognition function in the initial state of the setting menu will be described.

Figure 7A:
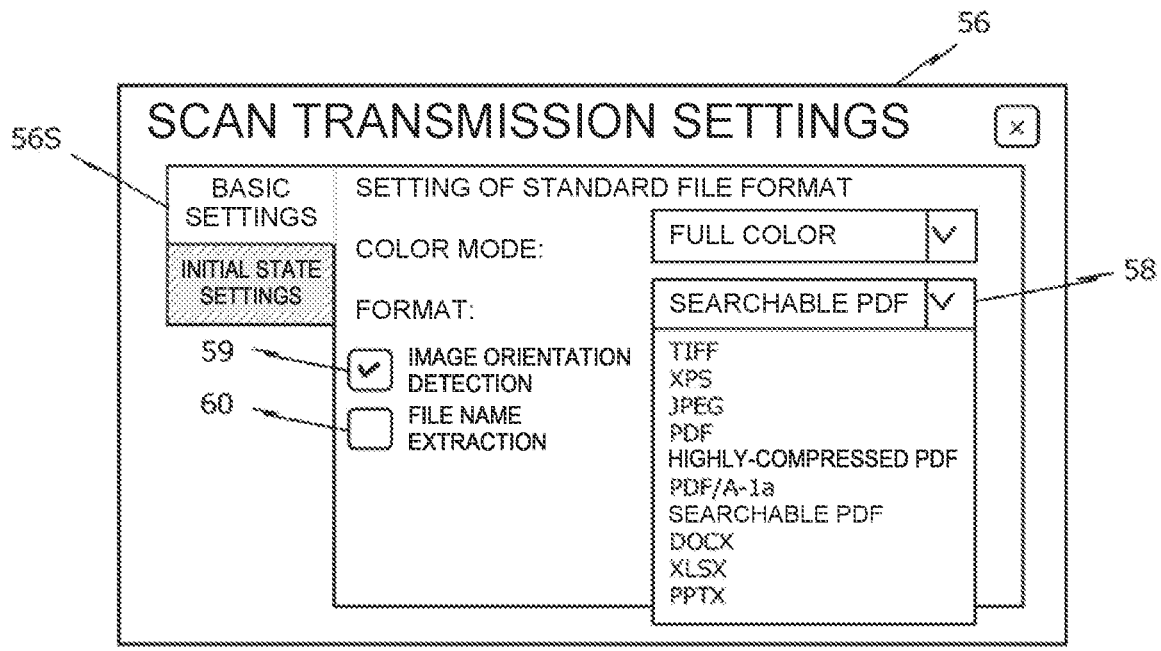
FIG. 7A is an explanatory diagram illustrating a basic setting screen of scan transmission setting, which is one of the setting menus, in the present embodiment.

FIG. 7A is an explanatory diagram illustrating an example of a scan transmission setting screen 56 in which some of the items indicated on the scan transmission screen 52 illustrated in FIG. 4A and the transmission format screen 54 illustrated in FIG. 4B are assembled on one screen. Strictly speaking, a basic setting screen 56S, which constitutes a part of the scan transmission setting screen 56, is shown.

As in FIG. 4A, setting regarding items corresponding to the color mode and the format related to document reading is received as the setting. Items such as the document, resolution, density, and other functions that are indicated in FIG. 4A are not included in the scan transmission setting screen 56 illustrated in FIG. 7A. Those items may be included, but since they are not affected by the setting to allow/prohibit the OCR function, the presence or absence of those items is not important in the description of the present embodiment.

In addition, in place of the transmission format screen 54 of FIG. 4B, the operation controller 20 displays a drop-down list 58 to set a file format (a format) for transmission on the scan transmission setting screen 56. The user sets the file format by using the drop-down list 58 on the scan transmission setting screen 56, instead of using the soft keys illustrated in FIG. 4B. The drop-down list is used for an operation of selecting one item from a plurality of options. In the example illustrated in FIG. 7A, 10 types of file formats, i.e., TIFF, XPS, JPEG, PDF, highly-compressed PDF, PDF/A-1a, searchable PDF, DOCX, XLSX, and PPTX, can be set. Searchable PDF is set as a default (the setting of the initial state before the user performs an operation). The default of each item is stored in the initial state storage 36D. Among the above file formats, there are five types of file formats, i.e., TIFF, XPS, JPEG, PDF, and highly-compressed PDF, as the file formats that do not require the OCR function. Meanwhile, there are five types of file formats, i.e., PDF/A-1a, searchable PDF, DOCX, XLSX, and PPTX, as the file formats that require the OCR function.

In addition to those setting items, the scan transmission setting screen 56 illustrated in FIG. 7A includes a check box 59 to allow or prohibit the function of image orientation detection and a check box 60 to allow or prohibit the function of file name extraction. The functions of the image orientation detection and the file name extraction are both functions that use the OCR function. The image orientation detection corresponds to the function of determining that top-bottom directions of characters extracted from a document by the OCR processing represents a top-bottom direction of an image when the top-bottom directions of the characters are aligned in one direction beyond a predetermined ratio. Further, the file name extraction corresponds to the function of adopting any of the characters extracted from the document by the OCR processing as the file name.

Figure 7B:
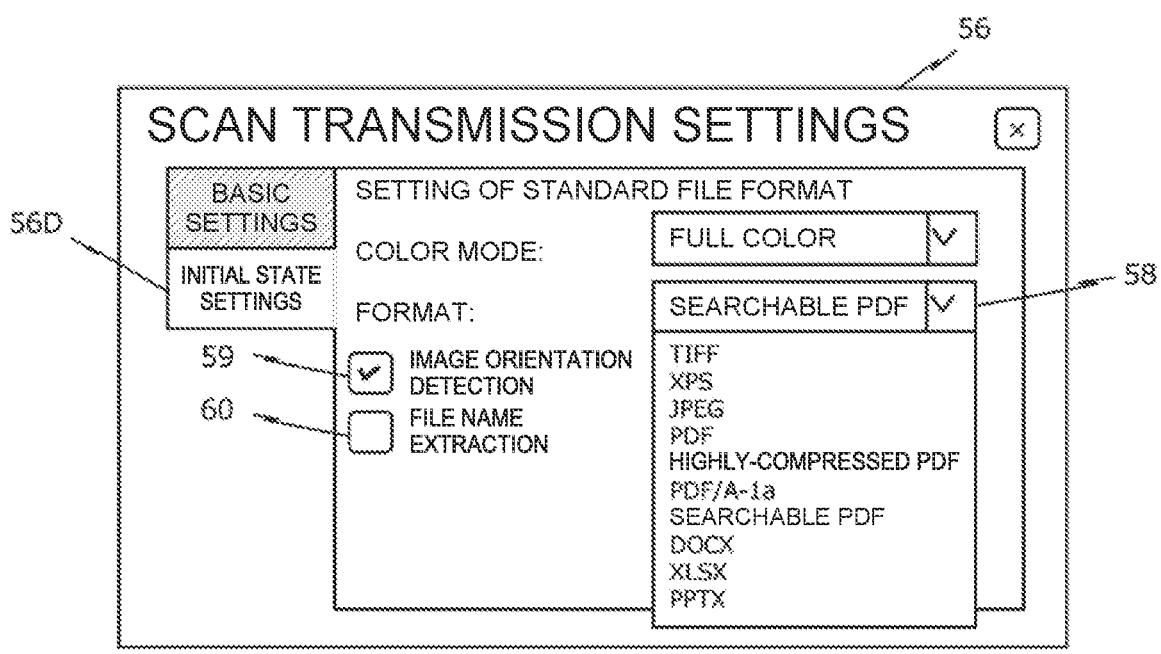
FIG. 7B is an explanatory diagram illustrating an initial state setting screen of the scan transmission setting, which is one of the setting menus, in the present embodiment.

FIG. 7B illustrates an initial state setting screen 56D which constitutes a part of the scan transmission setting screen 56. The screen is for setting the initial state which is a state before the user operates the basic setting screen 56S illustrated in FIG. 7A. That is, the screen is for setting the initial state when the scan transmission setting screen 56 is to be displayed on the display 30D. The arrangement of the screen corresponds to that of the basic setting screen 56S, and the user sets or changes each item on the initial state setting screen 56D. The initial state that has been set or changed is stored in the initial state storage 36D. When displaying the basic setting screen 56S on the display 30D, the operation controller 20 refers to the initial state of each item stored in the initial state storage 36D and reflects the referred initial state in the display.

FIG. 7A is an example of the scan transmission setting screen 56 displayed on the display 30D by the operation controller 20 when the OCR function is set to be allowed.

Figure 8A:
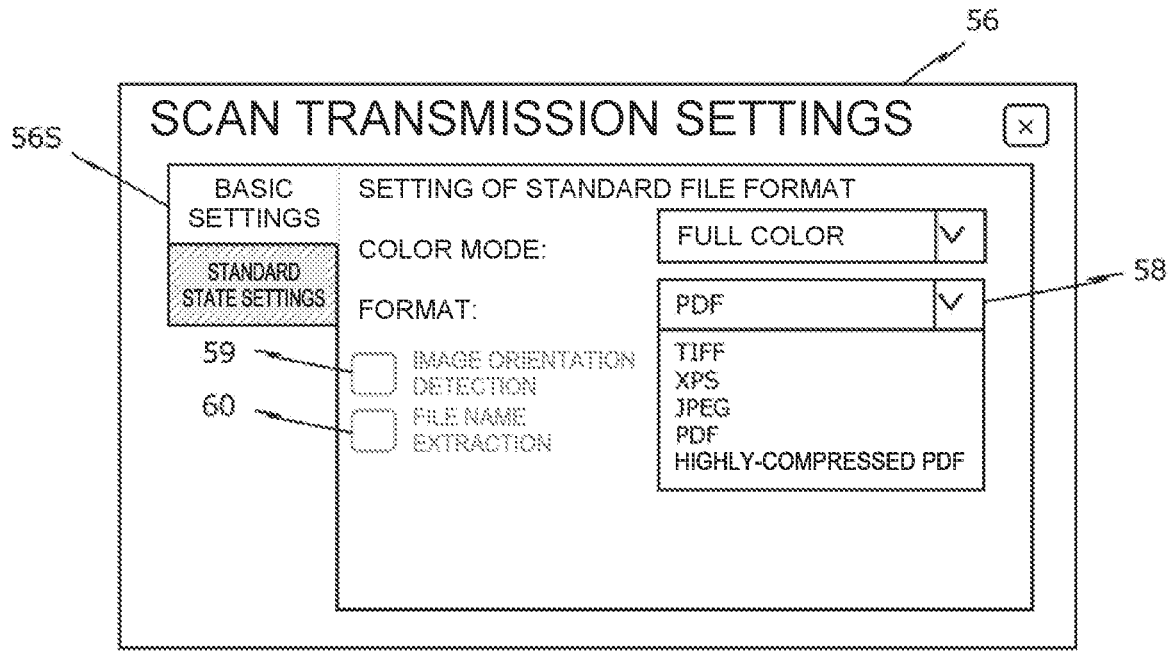
FIG. 8A is an explanatory diagram illustrating a basic setting screen of scan transmission setting to be presented when a character recognition function is prohibited in the present embodiment.

In contrast, FIG. 8A is an example of the scan transmission setting screen 56 displayed on the display 30D by the operation controller 20 when the OCR function is set to be prohibited. A difference from the scan transmission setting screen 56 illustrated in FIG. 7A is that the initial state of the drop-down list 58 is PDF in FIG. 8A, instead of searchable PDF as in FIG. 7A. Further, as compared to the options of the drop-down list 58 illustrated in FIG. 7A, the point that the five types of file formats described above that require the OCR function are excluded from the options (i.e., not displayed), in other words, hidden, is different in FIG. 8A.

The scan transmission setting screen 56 of FIG. 8A displays only the five types of file formats, i.e., TIFF, XPS, JPEG, PDF, and highly-compressed PDF, which do not require the OCR function. In the example illustrated in FIG. 8A, setting items corresponding to the file formats that require the OCR function are hidden. However, such options may be grayed out, for example, to indicate that they are not to be set (i.e., cannot be selected).

Further, in FIG. 8A, items of the check boxes 59 and 60 illustrated in FIG. 7A are displayed to be grayed out with a check mark removed. That is, it is indicated that the functions of the image orientation detection and the file name extraction requiring the OCR function cannot be set. Further, the initial state is the setting which makes these functions unselectable (disabled).

When the device setting screen 50 illustrated in FIG. 3 is operated, and the setting is changed to prohibit the OCR function which has been allowed until then, the operation controller 20 causes, if an option which requires the OCR processing is set as the initial state as illustrated in FIG. 7B, this initial state to be replaced by an option which does not require the OCR processing. As a specific example, in the drop-down list 58 illustrated in FIG. 7A, searchable PDF that requires the OCR processing is set as the initial state. When the setting is changed to prohibit the OCR function, the operation controller 20 replaces the setting of the initial state so that "PDF", which does not require the OCR processing, is set, as illustrated in FIG. 8A. The initial state for replacement may be determined in advance from among those that do not require the OCR processing. Alternatively, the user may be able to select one from among those that do not require the OCR processing.

Figure 8B:
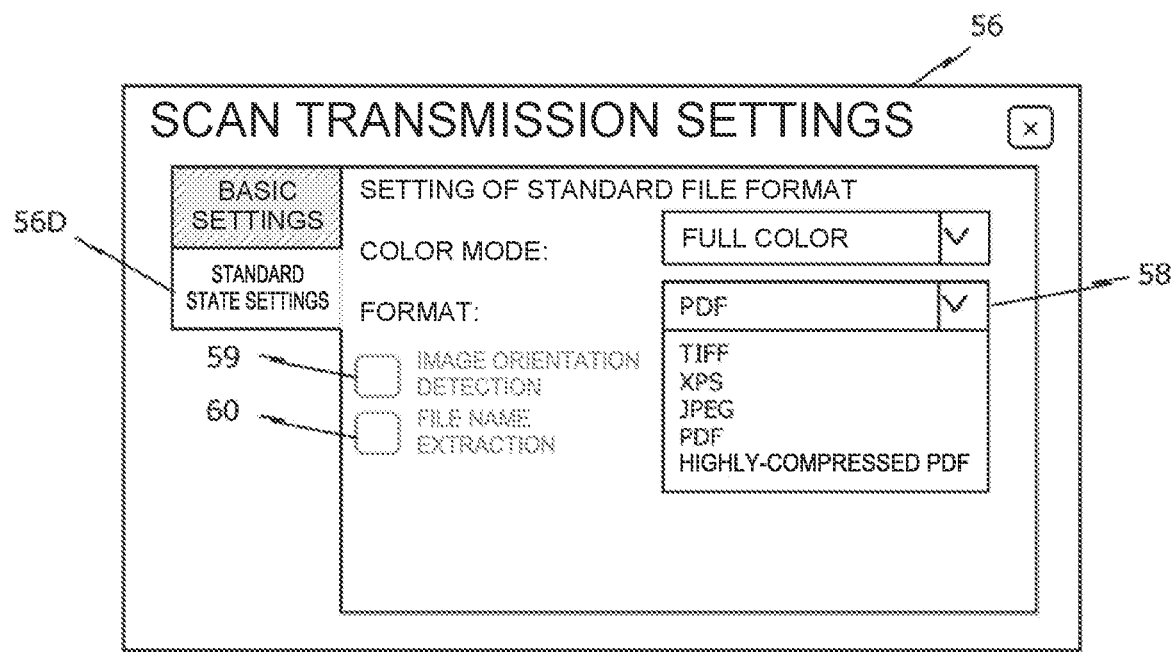
FIG. 8B is an explanatory diagram illustrating an initial state setting screen of the scan transmission setting to be presented when the character recognition function is prohibited in the present embodiment.

Furthermore, as illustrated in FIG. 8B, the operation controller 20 reflects the replaced default in the initial state of the drop-down list 58 on the initial state setting screen 56D. In addition to the above, options of the initial state which are to be displayed in the drop-down list 58 are changed to only TIFF, XPS, JPEG, PDF, and highly-compressed PDF, which are the five types of file formats that do not require the OCR function. Further, the items of the check boxes 59 and 60 illustrated in FIG. 8B are displayed to be grayed out with a check mark removed. By doing so, the functions of the image orientation detection and the file name extraction that require the OCR function are prevented from being set to the initial state.

Figure 9:
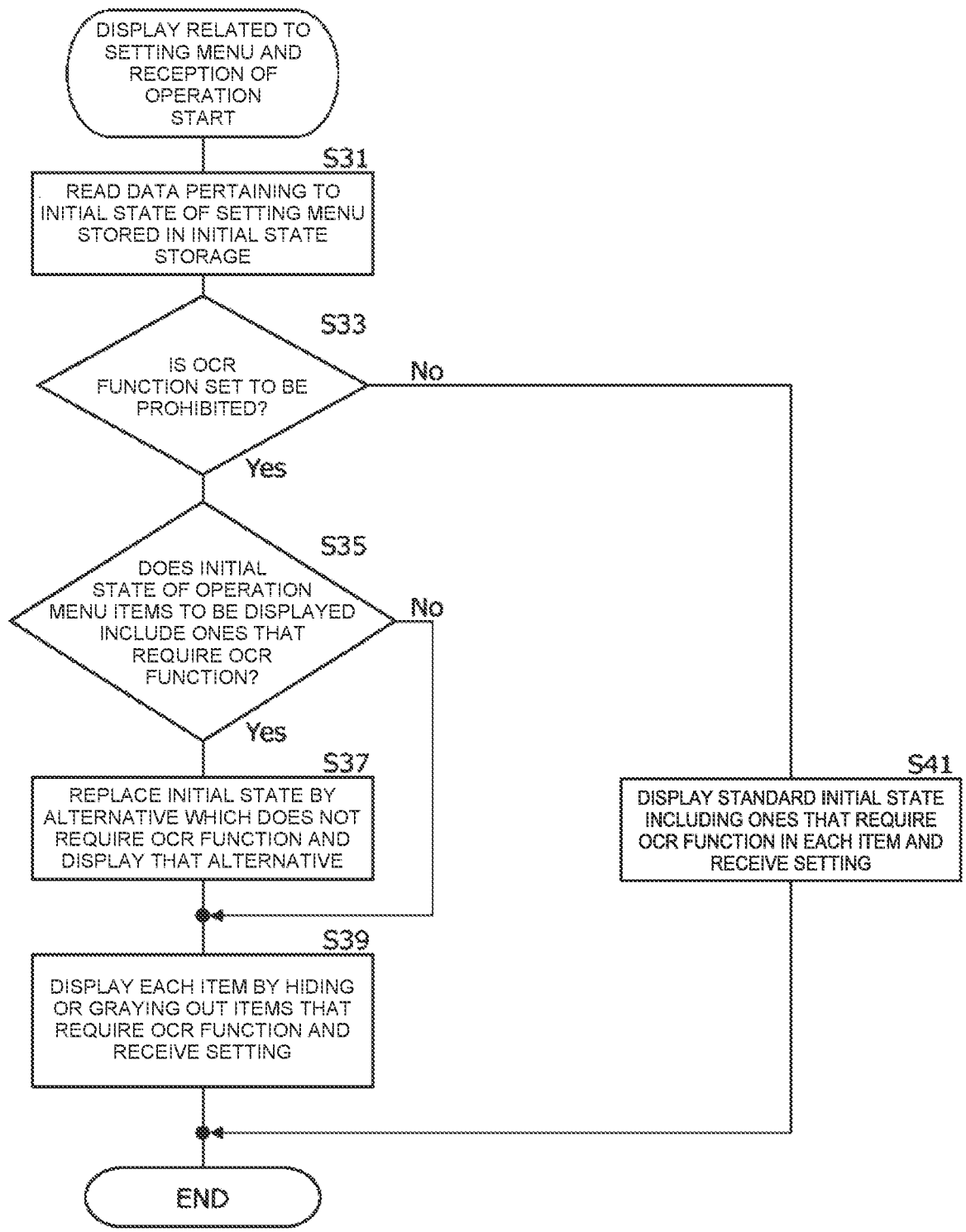
FIG. 9 is a flowchart illustrating processing executed by the controller in the examples shown in FIGS. 7A and 8A.

FIG. 9 is a flowchart illustrating the processing executed by the controller 12 serving mainly as the operation controller 20 in the examples shown in FIGS. 7A and 8A. As illustrated in FIG. 9, when the controller 12 serving as the operation controller 20 displays any of the screens of the setting menu on the display 30D, the controller 12 refers to the initial state storage 36D and acquires data pertaining to the initial state of the setting menu which should be displayed (step S31).

Then, the operation controller 20 determines whether the OCR function is set to be prohibited (step S33).

If the OCR function is set to be prohibited, the operation controller 20 determines whether or not the setting that requires the OCR function has already been set as a default (step S35). As regards the item for which the setting that requires the OCR function has already been set as the default, the default of that item is replaced by an alternative which does not require the OCR function and the alternative is displayed (step S37), as illustrated in FIG. 8A. In the example shown in FIG. 8A, "searchable PDF" registered as the default of the drop-down list 58 on the scan transmission setting screen 56 is replaced by "PDF", and "PDF" is displayed. In addition, a check mark in the check box 59 for the image orientation detection is removed in the display.

Further, by not displaying or graying out the options which require the OCR function of each item to indicate that such options are not selectable, only the options which do not require the OCR function are provided, and an operation of the setting is received (step S39). In the example illustrated in FIG. 8A, the options which require the OCR function among the options of the drop-down list 58 on the scan transmission setting screen 56 are hidden from the display. In addition, the check box 59 for the image orientation detection and the check box 60 for the file name extraction are grayed out to indicate that they are not selectable. In this way, the options which require the OCR function are prevented from being selected, and such functions are also prevented from being set.

Meanwhile, if the OCR function is set to be allowed (No in step S33), the operation controller 20 displays, as illustrated in FIG. 7A, both of the options which require the OCR function and the options which do not require the OCR function on the scan transmission setting screen 56 as the default and the options, and receives the setting (step S41).

The above is an example of the processing executed by the controller 12 regarding display of the setting menu and reception of an operation.

Embodiment 2

In Embodiment 1, the job setting storage 36S stores job setting data pertaining to individual jobs, and the operation controller 20 changes the job setting data stored in the job setting storage 36S in accordance with an operation of setting received in the setting menu. However, the job setting data stored in the job setting storage 36S is data pertaining to individual jobs and is basically deleted when execution of a target job is completed.

In the present embodiment, the function of having job setting data registered and calling the registered job setting data, thereby allowing a job to be executed by the called setting will be described. The function of having the job setting data registered such that the job setting data can be called in this way will be referred to as a job program in the present specification. By the job program, it becomes possible to call registered data, which is enabled by using a setting menu for registering job setting data and having the job setting data registered in advance.

As a function similar to the job program, another function that can be employed is the function of retaining job setting data pertaining to a job which has already been executed even after execution of the job and calling the retained job setting data, thereby allowing a job to be executed by the called setting. In the present specification, such a function will be referred to as a job history.

Another example of a similar function is an address book related to a scan transmission job. Generally, an address book corresponds to the function of saving the time and effort of the setting, which is enabled by having a transmission destination of data and an attribute of each transmission destination registered, and calling the registered transmission destination. In the present specification, it is assumed that an address book registers therein not only the transmission destination and the attribute pertaining to the transmission destination, but also the setting related to transmission including a file format employed in transmitting document data to an external device. That is, the address book in a scan transmission job can be considered as the function similar to a job program including the transmission destination.

FIG. 10A is an explanatory diagram illustrating one example of data registered as a job program 62 in the multifunction peripheral 10. The same applies to the job history. Further, FIG. 10B is an explanatory diagram illustrating one example of data registered as an address book 63 in the multifunction peripheral 10.

The job program 62 and the address book 63 are not settings related to individual jobs. Therefore, it is assumed that the job program 62 and the address book 63 belong to the basic setting data stored in the basic setting storage 36B. An operation of calling the registration data of the job program 62 (also the same for the job history) or the registration data of the address book 63 may be rephrased as copying data called in the job setting data (data pertaining to the job to be set) that is stored in the job setting storage 36S.

The registration data of the job program 62 illustrated in FIG. 10A pertains to a scan transmission job. The job program hands over the set contents to a setting manager 16 when an operation controller 20 receives the user operation related to the registration of the job program. The setting manager 16 stores the setting data that has been handed over in a basic setting storage 36B. When the operation controller 20 receives an operation of calling the registered job program, the setting manager 16 calls the registration data of the target job program and hands it over to the operation controller 20. The operation controller 20 applies the registration data of the called job program to the job setting of the job to be set.

The job history corresponds to the function of saving the setting of the job executed by the user for a certain period of time. When execution of the job is completed, a job controller 18 notifies the setting manager 16 of the completion of the job. In response to the notification, the setting manager 16 registers the job setting data pertaining to the job whose execution is completed in the basic setting storage 36B as the registration data of the job history. When the operation controller 20 receives an operation of calling the registered job history, the setting manager 16 calls the registration data of the target job history and hands it over to the operation controller 20. The operation controller 20 applies the registration data of the called job history to the job setting of the job to be set.

The registration data of the address book 63 illustrated in FIG. 10B includes items of a default of the file format to be employed in transmission and a default of the color mode to be employed in transmission, in addition to information on the transmission destination.

The operation controller 20 receives, in a state in which the OCR function is allowed, registration of an item which requires the OCR function for all of the job program 62, the job history, and the address book 63. The setting manager 16 stores the data handed over from the operation controller 20 in the basic setting storage 36B. After registration, it is assumed that the setting has been changed to prohibit the OCR function. Then, it is assumed that any of the job program 62, the job history, and the address book 63 is called in a state in which the OCR function is set to be prohibited. The setting manager 16 calls the registration data and hands over the registration data to the operation controller 20. The operation controller 20 to which the registration data has been handed over first replaces those items of the handed over registration data that have been registered with such a setting that the OCR function is required by the setting that does not require character recognition processing, and then calls the registration data as the job setting.

Figure 11:
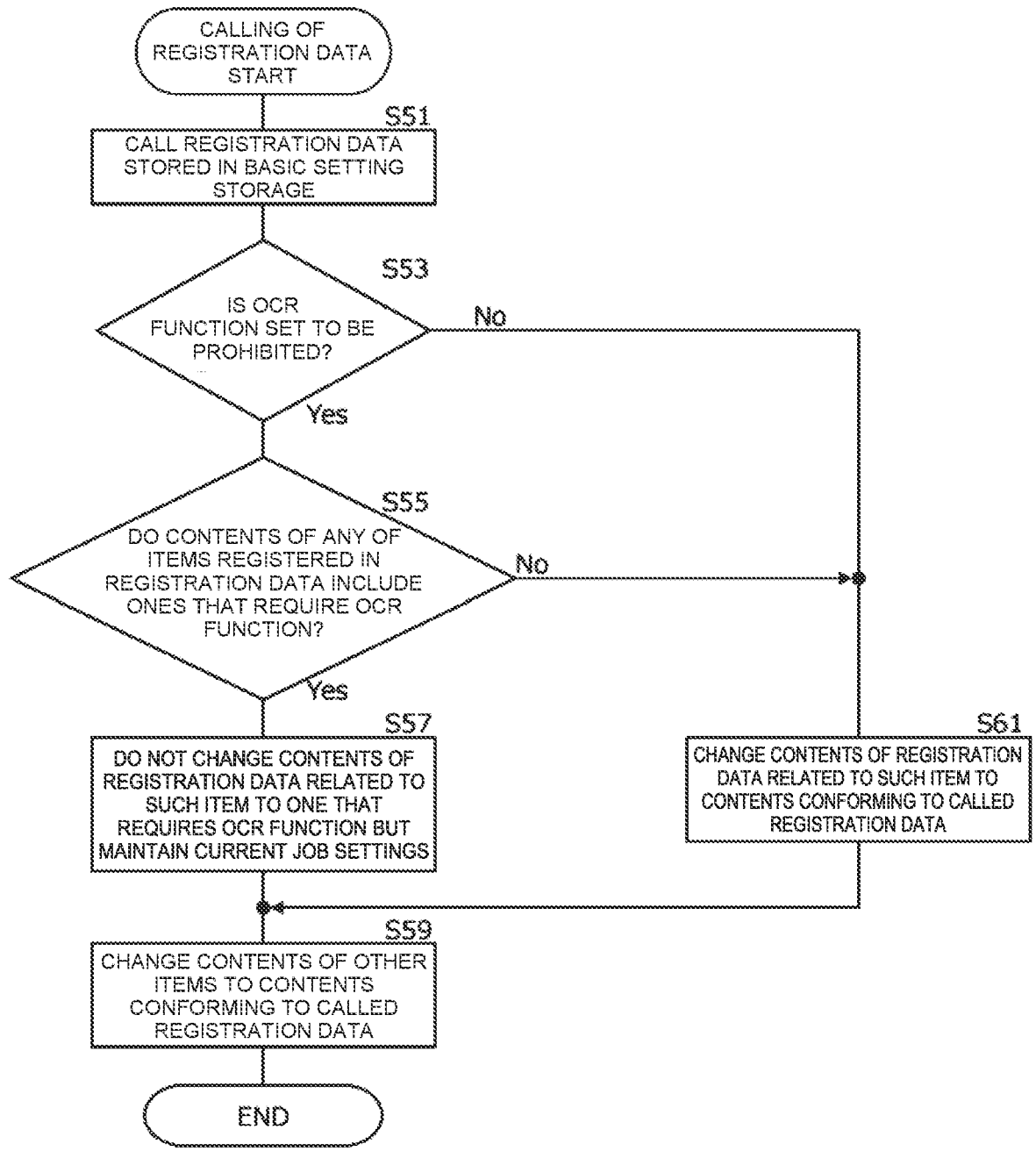
FIG. 11 is a flowchart illustrating processing executed by a controller with respect to calling of registration data in the present embodiment (Embodiment 2).

FIG. 11 is a flowchart illustrating an example of processing of calling the registration data in the present embodiment. Although the calling operation and the configuration of the called registration data of the job program, the job history, and the address book are different from one another, there is a commonality in the flow of the processing. Therefore, it is to be understood that the flowchart of FIG. 11 is applied to any of the aforementioned kinds of registration data.

When the operation controller 20 receives an operation related to calling of the registration data, the controller 12 serving as the operation controller 20 requests the setting manager 16 to call the target registration data. In response to the request, the controller 12 serving as the setting manager 16 calls the registration data and hands over the called registration data to the operation controller 20 (step S51). Then, when the registration data is handed over, the operation controller 20 determines whether the OCR function is set to be prohibited (step S53).

If the OCR function is set to be prohibited, the operation controller 20 determines whether or not any of the items of the handed over registration data is registered as the setting that requires the OCR function (step S55). If there is any item which has been registered as the setting that requires the OCR function (Yes in step S55), the operation controller 20 does not replace the item in question by the setting that requires the OCR function, but maintains the current setting (step S57).

This is because, as described in Embodiment 1, the current setting is the setting that does not require the OCR function. Since the functions of image orientation detection and file name extraction also require the OCR function, the current setting may be maintained for these items as well. However, such items are both set to be off, and thus, even if the registration data is called, those functions will be maintained to be off. To begin with, in a state in which the OCR function is prohibited, as illustrated in FIG. 8A, those items are grayed out and is out of a target of the setting. Thus, those items can be considered as not being a target of calling in the first place.

In the example of the job program 62 illustrated in FIG. 10A, the format among the respective items of the registration data, i.e., the setting of the file format of data to be transmitted to an external device, is registered to be DOCX, which requires the OCR function. The operation controller 20 does not replace the item in question by "DOCX" of the registration data, but maintains the current setting.

In the example of the address book 63 illustrated in FIG. 10B, the format to be employed in E-mail transmission among the respective items of the registration data, i.e., the setting of the file format of data to be transmitted to an external device, is registered to be DOCX, which requires the OCR function. When a job to be set is one related to E-mail transmission among the scan transmission jobs, the operation controller 20 does not replace the item in question by "DOCX" of the registration data, but maintains the current setting.

In addition, the setting of the format to be employed in FTP transmission among the respective items of the registration data is registered to be searchable PDF, which requires the OCR function. When a job to be set is one related to FTP transmission, the operation controller 20 does not replace the item in question by "searchable PDF" of the registration data, but maintains the current setting.

For the other items which do not require the OCR function among the respective items of the registration data, the setting of the corresponding item in the setting menu is changed according to the registration data (step S59).

Meanwhile, if the OCR function is set to be allowed (No in step S53), the operation controller 20 changes the setting of the item in the setting menu according to the registration data for both of the items that require the OCR function and the items that do not require the OCR function (step S61 and step S59).

Then, a user operation for the setting menu is received.
The above is the processing executed by the controller 12 regarding the calling of the registration data.

Embodiment 3

Some image processing apparatuses are provided with a function of storing data pertaining to an image of a document that has been read in a storage device, together with data pertaining to job settings, and calling (downloading) the stored data by a user operation and transmitting the stored data to an external device or performing printing. In the present specification, such a function is referred to as a filing function and the stored data is referred to as filing data.

In the present embodiment, it is assumed that a multifunction peripheral 10 is provided with the filing function. It is assumed that a controller 12 receives the operation via an operator 30 or from an external device (for example, the external device 42 or 44 illustrated in FIG. 2) that is connected via a communication controller 26.

When the multifunction peripheral 10 executes a copy job or a scan transmission job, the multifunction peripheral 10 can store data pertaining to the job in a storage device 36. The data pertaining to the job includes data pertaining to an image of a document that has been read and data pertaining to job settings. The storage device 36 is provided with a filing data storage 36F which stores data pertaining to the jobs as filing data. The controller 12 downloads the data stored in the filing data storage 36F, together with the corresponding job setting data, and performs printing or transmits the data to an external device.

While printing and transmission of the filing data can be performed with the same settings as those at the time of storage in the filing data storage 36F, the settings can be changed before the printing or the transmission.

The filing data is stored in the filing data storage 36F with the image data as it is in a data format specific to the multifunction peripheral 10 that can be read by a scanner portion 32 and processed by an image processor 22. However, such specific image data may be converted into a format (e.g., PDF, DOCX, or the like) that can be viewed by an information processing device, such as a PC or a smartphone of the external devices 42 and 44, by means of the image processor 22, and stored in the filing data storage 36F together with the original specific image data. By doing so, it becomes possible to download the filing data to the external device 42 by performing remote control from the PC of the external device 42, for example, and view the filing data on the external device 42.

In the present embodiment, the filing data is data obtained by adding data, which is in a format that can be viewed on a PC, and printer data to the image data in the specific format. In addition, a thumbnail image with a reduced resolution of the image data is added for display on a display 30D or a screen of a user interface of the external device. Furthermore, job setting data of a job for which the image data in the specific format has been generated is added as job setting information.

Figure 12:
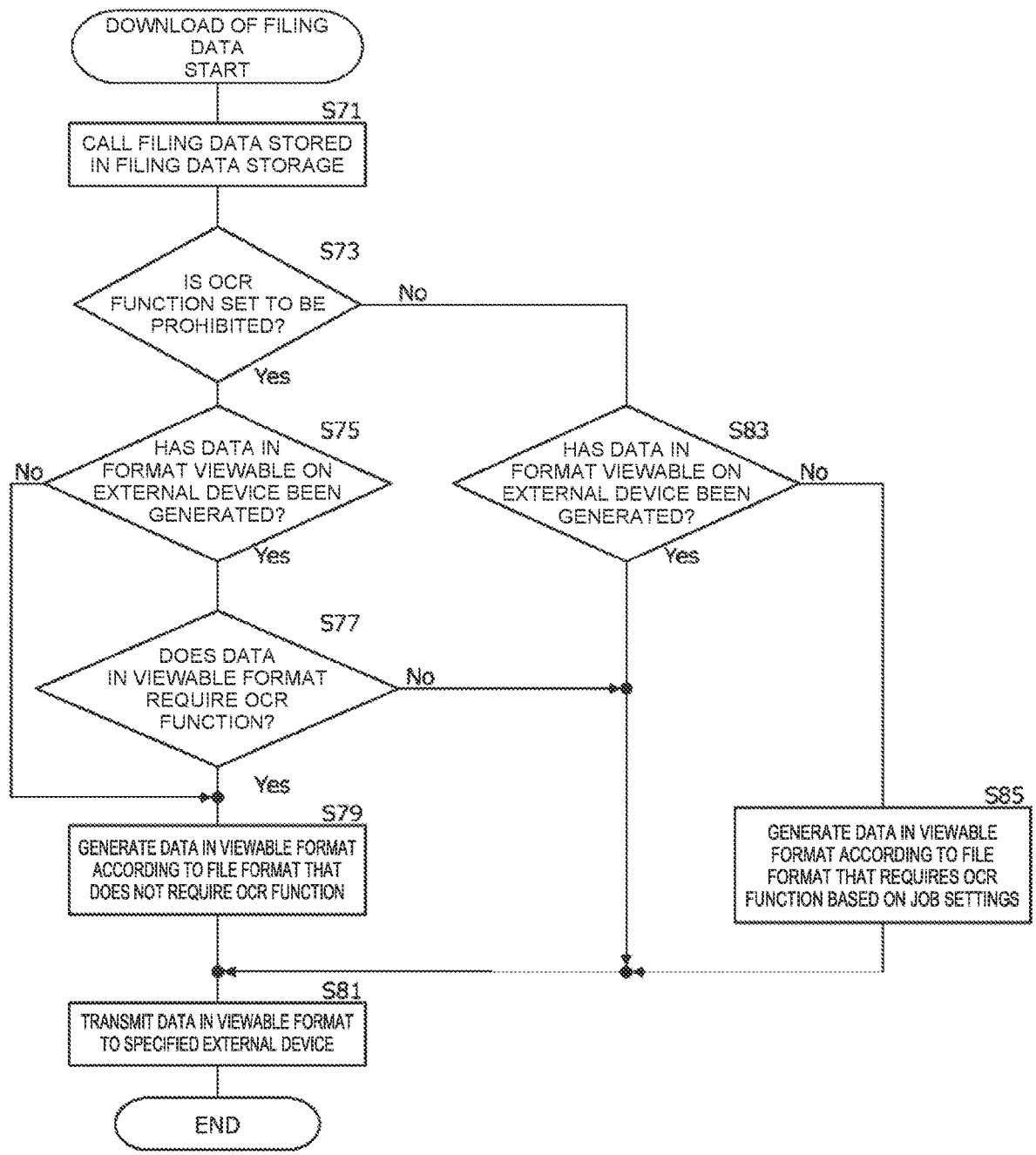
FIG. 12 is a flowchart illustrating processing executed by a controller with respect to a download of filing data in the present embodiment (Embodiment 3).

FIG. 12 is a flowchart illustrating an example of processing executed by the controller 12 with respect to a download of the filing data in the present embodiment. Processing to be performed when downloading the filing data stored in the filing data storage 36F to the PC of the external device 42 will be described as an example. The processing of downloading the filing data to the external device 42 is executed as a single job.

When a request to download filing data is received from the external device 42, the controller 12 serving as a job controller 18 starts the job of downloading the filing data. In response to an instruction from the job controller 18, the image processor 22 reads the filing data stored in the filing data storage 36F to a memory area for use in data transmission (step S71). Then, allowance/prohibition setting for OCR processing that is stored in a basic setting storage 36B is referred to (step S73).

If an OCR function is set to be prohibited, data in a format that uses the OCR function for generation cannot be transmitted outside, so the following processing is performed. The controller 12 serving as the job controller 18 determines whether or not data in a format that can be viewed by the user on the external device 42 has already been generated (step S75). If data in a format that can be viewed has not been generated yet (No in step S75), the job controller 18 shifts the processing to step S79, which will be described later.

Meanwhile, if data in a format that can be viewed on the external device 42 has already been generated (Yes in step S75), the job controller 18 determines whether or not the generated data in the format that can be viewed is one that requires the OCR function in the generation (step S77).

If the generated data in the format that can be viewed is one that requires the OCR function in the generation (Yes in step S77), the image processor 22 is again made to generate data in a format that does not require the OCR function in the generation (step S79).

Then, if no thumbnail image has been generated, the image processor 22 is made to generate a thumbnail image. After that, the data in the format that can be viewed generated in step S79 described above, the thumbnail image, and job setting information are transmitted to the external device 42 (step S81), and the job is ended.

Meanwhile, in the determination of step S77 described above, if the generated data in the format that can be viewed is not one that requires the OCR function in the generation (No in step S77), the job controller 18 transmits the already-generated data, the thumbnail image, and the job setting information to the external device 42 (step S81), and ends the job.

In the determination of step S73 described above, if the OCR function is allowed, the job controller 18 determines whether or not data in a format that can be viewed by the user on the external device 42 has already been generated (step S83). If data in a format that can be viewed has already been generated (Yes in step S83), the job controller 18 transmits the already-generated data, the thumbnail image, and the job setting information to the external device 42 (step S81), and ends the job.

Meanwhile, if data in a format that can be viewed on the external device 42 has not been generated yet (No in step S83), the job controller 18 causes the image processor 22 to generate data in a format that can be viewed by the user on the external device 42 in accordance with job setting information (step S85). Then, if no thumbnail image has been generated, the image processor 22 is made to generate a thumbnail image. After that, the data in the format that can be viewed generated in step S85 described above, the thumbnail image, and the job setting information are transmitted to the external device 42 (step S81), and the job is ended.

The above is the processing executed by the controller 12 regarding the download of the filing data.

Embodiment 4

In the above embodiments, it has been described that the setting manager 16 assumes not the settings related to individual jobs of the multifunction peripheral 10 but the basic settings to be continuously applied to the processing of the multifunction peripheral 10 as the target of management. Thus, the basic settings can be considered as the setting targeted at any user who uses the multifunction peripheral 10.

However, some image processing apparatuses authenticate a user at the time of use, and manage the authenticated user. In the present embodiment, it is assumed that a multifunction peripheral 10 is provided with a user authenticator 28 which authenticates users and manages the authenticated users.

In the present embodiment, a setting manager 16 stores the basic settings for each of the authenticated users in a basic setting storage 36B, and individually manages the basic settings. Accordingly, even in a case where the OCR function is allowed in the multifunction peripheral 10 as a whole, if the OCR function is prohibited by the setting of each authenticated user, a controller 12 performs the control so that the authenticated user who is prohibited to use the OCR function cannot use the OCR function.

Meanwhile, in a case where the OCR function is prohibited in the multifunction peripheral 10 as a whole, irrespective of the setting of whether the OCR function is allowed or prohibited for each authenticated user, the controller 12 performs the control so that none of the users can use the OCR function.

As described above, (i) An image processing apparatus according to the present disclosure is provided with: a character recognition processor which reads an image of a document and extracts text information included in the document; a setting manager which manages settings including a setting to allow or prohibit a function of character recognition by the character recognition processor; a job controller which controls execution of a job related to reading of the document; and an operation controller which provides, to a user, a setting menu to receive a setting of one or more items related to the execution of the job and receives a setting from the user, and the operation controller is characterized in that when the function of the character recognition is set to be prohibited, the operation controller prevents the user from setting a function that requires the character recognition.

In the present disclosure, the character recognition processor performs character recognition processing of extracting the text information included in the document, either alone or in cooperation with an external device. For the character recognition processing itself, a well-known technique may be applied.

Further, the setting manager allows or prohibits the function of character recognition on the basis of an instruction by the user. The setting to allow or prohibit the function of character recognition may be integrated with the setting menu provided by the operation controller, and the setting manager may be implemented by using hardware resources in common with the operation controller.

Furthermore, the job controller controls a series of processes related to image processing. As a specific mode of the above, for example, the hardware resources are configured from a circuit including a processor and a memory as the main elements. The function may be implemented by execution of a processing program stored in the memory by the processor.

The operation controller provides the setting menu to the user and receives a setting from the user. That is, the operation controller carries out processing related to a user interface. As a specific mode of the above, the hardware resources may be configured from a circuit including a processor and a memory as the main elements, and the function may be implemented by execution of a processing program stored in the memory by the processor. The operation controller may be implemented by using the hardware resources in common with the job controller described above.

Preventing the user from setting a function that requires character recognition means, for example, hiding the function that requires character recognition from the setting menu or indicating that such a function is not to be set.

Hiding the function from the setting menu means that an item related to that function is not to be provided as the setting menu. A specific mode of the above includes, for example, preventing a setting item or an option provided by the setting menu from including ones related to the above function.

Indicating in the setting menu that the function is not to be set means that while an item related to such a function is provided as the setting menu, the item is provided in a form that is different from the other functions to be set, so that the user can recognize that the function cannot be set. Examples of a different form include graying out items which are not the target of setting and adding strike-throughs, whereby the user can identify that the item is different from the target of setting.

A case where a function that requires character recognition has already been set refers to a state in which the function that requires the character recognition has been registered when there is a function of registering and retaining a setting, for example.

Further, preferred modes of the present disclosure will be described.

(ii) The operation controller may enable, when a function that requires the character recognition has already been set, the function to be replaced by another function.

In this way, even if any function that requires the character recognition has already been set at the time of making the setting to prohibit the function of the character recognition, the already-set function can be replaced by another function. By such replacement, it is possible to prevent inconsistency from occurring between the setting to prohibit the function of the character recognition and the function to be executed.

(iii) An initial state storage, which stores an initial state of each item of the setting menu, may further be provided, and the operation controller may provide, to the user, a setting menu to receive a setting of the initial state of each item by the user; store the received initial state in the initial state storage; and prevent, when the function of the character recognition is set to be prohibited, the setting menu related to the setting of the initial state of each item from displaying an option of a setting that requires processing of character recognition.

According to this mode, when the function of character recognition is set to be prohibited, ones that require processing of character recognition are prevented from being displayed as the initial state of the setting menu, whereby occurrence of inconsistency in the operation can be avoided.

(iv) The operation controller may replace, when an initial state of each item is set with processing of the character recognition being set to be allowed, and the function of the character recognition is thereafter set to be prohibited, the initial state which requires the processing of the character recognition by an initial state which does not require the processing of the character recognition, and provide a setting menu of the replaced initial state and receive a setting related to execution of a job from the user. According to this mode, when an initial state is set with the function of character recognition being allowed, and the function of the character recognition is thereafter set to be prohibited, the initial state which requires processing of character recognition is replaced by an initial state which does not require the processing of character recognition in an operation menu, whereby occurrence of inconsistency in the operation can be avoided.

(v) A job setting storage, which stores a job setting related to execution of the job, may be further provided, and the operation controller may provide, to a user, a setting menu related to registration of the job setting by the user and calling of a registered job setting; store the registered job setting in the job setting storage; and replace, when a job setting is registered with processing of the character recognition being set to be allowed, and the function of the character recognition is thereafter set to be prohibited and the job setting is called, a setting that requires the processing of the character recognition by a setting that does not require the processing of the character recognition before calling the setting.

According to this mode, when a job is registered with the function of character recognition being allowed, and the function of the character recognition is thereafter set to be prohibited, in the case of calling a registered job setting, the calling can be performed by replacing the setting which requires processing of character recognition by a setting which does not require the processing of character recognition, whereby occurrence of inconsistency in the operation can be avoided.

(vi) A filing data storage, which stores data of a document that has been read as the job is executed, may further be provided, and the job controller may store the data of the document in the filing data storage in accordance with a job setting related to execution of a job; and read and transmit, in accordance with an instruction by a user, the data of the document stored in the filing data storage to outside, in which when the data of the document is stored in the filing data storage with processing of the character recognition being set to be allowed, and the function of the character recognition is thereafter set to be prohibited and an instruction to read and transmit the data of the document to outside is received, if the data of the document stored in the filing data storage is in a data format that requires the processing of the character recognition, the data of the document may be first converted into a data format that does not require the processing of the character recognition, and then transmitted to outside.

According to this mode, when data of a document is stored with the function of character recognition being allowed, and the function of the character recognition is thereafter set to be prohibited, in calling and transmitting the registered data of the document to the outside, the transmission can be performed by converting the data in a format that requires processing of character recognition into data in a format that does not require the processing of character recognition. Thus, inconsistency with the setting can be prevented from occurring.

(vii) A user authenticator, which authenticates a user or a user group, may further be provided, and the setting manager may manage settings including a setting to allow or prohibit a function of character recognition by the character recognition processor for each user or user group.

In this way, the setting to allow or prohibit the function of character recognition can be set and managed for each user or each user group.

(viii) One aspect of the present disclosure includes an image processing method in which a processor of an image processing apparatus executes the image processing method including: a step of using a character recognition processor to read an image of a document and extract text information included in the document; a step of managing settings including a setting to allow or prohibit a character recognizing step by the character recognition processor; a step of controlling execution of a job related to reading of the document based on the setting; and a step of providing, to a user, a setting menu to receive a setting of one or more items related to the execution of the job, and receiving a setting from the user, in which when a function of the character recognizing is set to be prohibited, a function that requires the character recognizing is hidden from the setting menu or is indicated that the function is not to be set, and when the function that requires the character recognizing has already been set, the function is enabled to be replaced by another function.

The aspect of the present disclosure also includes a combination of any of a plurality of aspects described above. Various modifications may be made to the present disclosure in addition to the above-described embodiments. Such modifications should not be construed as falling outside the scope of the present disclosure. The present disclosure should embrace the claims and their equivalents, and all modifications within the scope of the claims.

What is claimed is:

1. An image processing apparatus comprising:
   a character recognition processor which reads an image of a document and extracts text information included in the document;
   a setting manager which manages settings including a setting to allow or prohibit a function of character recognition by the character recognition processor;
   a job controller which controls execution of a job related to reading of the document; and
   an operation controller which provides, to a user, a setting menu to receive a setting of one or more items related to the execution of the job and receives a setting from the user, wherein
   the operation controller prevents, when the function of the character recognition is set to be prohibited, the user from setting a function that requires the character recognition.

2. The image processing apparatus according to claim 1, wherein when a function that requires the character recognition has already been set, the operation controller enables the function to be replaced by another function.

3. The image processing apparatus according to claim 1, further comprising an initial state storage which stores an initial state of each item of the setting menu, wherein
   the operation controller provides, to the user, a setting menu to receive a setting of the initial state of each item by the user, stores the received initial state in the initial state storage, and prevents, when the function of the character recognition is set to be prohibited, the setting menu related to the setting of the initial state of each item from displaying an option of a setting that requires processing of character recognition.

4. The image processing apparatus according to claim 3, wherein when an initial state of each item is set with processing of the character recognition being set to be allowed, and the function of the character recognition is thereafter set to be prohibited, the operation controller replaces the initial state which requires the processing of the character recognition by an initial state which does not require the processing of the character recognition, and provides a setting menu of the replaced initial state and receives a setting related to execution of a job from the user.

5. The image processing apparatus according to claim 2, further comprising a job setting storage which stores a job setting related to execution of the job, wherein:
the operation controller provides, to a user, a setting menu related to registration of the job setting by the user and calling of a registered job setting;
the setting manager stores the registered job setting in the job setting storage; and
when a job setting is registered with processing of the character recognition being set to be allowed, and the function of the character recognition is thereafter set to be prohibited and the job setting is called, the operation controller replaces a setting for an item of the job setting registered with contents that require the processing of the character recognition by a setting that does not require the processing of the character recognition before calling the setting.

6. The image processing apparatus according to claim 2, further comprising a filing data storage which stores data of a document that has been read as the job is executed, wherein
the job controller stores the data of the document in the filing data storage in accordance with a job setting related to execution of a job, and reads and transmits to outside, the data of the document stored in the filing data storage, in accordance with an instruction by a user, and when the data of the document is stored in the filing data storage with processing of the character recognition being set to be allowed, and the function of the character recognition is thereafter set to be prohibited and an instruction to read and transmit to outside the data of the document is received, if the data of the document stored in the filing data storage is in a data format that requires the processing of the character recognition, the job controller converts the data of the document into a data format that does not require the processing of the character recognition and transmits the converted data to outside.

7. The image processing apparatus according to claim 1, further comprising a user authenticator which authenticates a user or a user group, wherein
the setting manager manages settings including a setting to allow or prohibit a function of character recognition by the character recognition processor for each user or user group.

8. An image processing method in which a processor of an image processing apparatus executes the image processing method comprising:
using a character recognition processor to read an image of a document and extract text information included in the document;
managing settings including a setting to allow or prohibit character recognizing by the character recognition processor;
controlling execution of a job related to reading of the document based on the setting; and
providing, to a user, a setting menu to receive a setting of one or more items related to the execution of the job, and receiving a setting from the user, wherein
when a function of the character recognizing is set to be prohibited, a function that requires the character recognizing is prevented from being set by the user.

* * * * *